(12) United States Patent
Matsuda et al.

(10) Patent No.: US 8,363,197 B2
(45) Date of Patent: *Jan. 29, 2013

(54) LIQUID CRYSTAL DISPLAY DEVICE AND ITS MANUFACTURING METHOD

(75) Inventors: Hiroshi Matsuda, Gifu (JP); Hideki Kawada, Owaniasahi (JP)

(73) Assignee: Sony Corporation, Tokyo (JP)

( * ) Notice: Subject to any disclaimer, the term of this patent is extended or adjusted under 35 U.S.C. 154(b) by 566 days.

This patent is subject to a terminal disclaimer.

(21) Appl. No.: 12/238,051

(22) Filed: Sep. 25, 2008

(65) Prior Publication Data

US 2009/0026455 A1    Jan. 29, 2009

Related U.S. Application Data

(63) Continuation of application No. 11/488,144, filed on Jul. 18, 2006, now Pat. No. 7,446,845.

(30) Foreign Application Priority Data

Jul. 21, 2005   (JP) ................................ 2005-211407

(51) Int. Cl.
    *G02F 1/1345* (2006.01)
(52) U.S. Cl. ...................... 349/149; 349/151; 349/152
(58) Field of Classification Search ................. 349/149, 349/151, 152
    See application file for complete search history.

(56) References Cited

U.S. PATENT DOCUMENTS

| 5,347,379 | A | * | 9/1994 | Kawagishi et al. | 349/52 |
| 6,396,554 | B1 | * | 5/2002 | Matsuda | 349/139 |
| 6,587,164 | B2 | * | 7/2003 | Onisawa et al. | 349/43 |
| 6,724,443 | B1 | * | 4/2004 | Sano et al. | 349/39 |
| 6,771,348 | B2 | | 8/2004 | Oh et al. | |
| 6,937,314 | B2 | * | 8/2005 | Kim | 349/149 |
| 7,084,569 | B2 | * | 8/2006 | Tachibana et al. | 313/583 |
| 7,098,985 | B2 | * | 8/2006 | Ishida | 349/152 |
| 7,495,388 | B2 | * | 2/2009 | Chung et al. | 313/506 |
| 2004/0080688 | A1 | * | 4/2004 | Ishida | 349/113 |
| 2006/0244893 | A1 | * | 11/2006 | Oda | 349/151 |
| 2007/0019121 | A1 | * | 1/2007 | Matsuda et al. | 349/43 |
| 2007/0076136 | A1 | * | 4/2007 | Matsuda | 349/43 |

FOREIGN PATENT DOCUMENTS

| CN | 1412614 | 4/2003 |
| JP | 2000-206568 | 7/2000 |
| JP | 2002-229058 | 8/2002 |
| JP | 2005-99311 | 4/2005 |
| KR | 2002-0065785 | 8/2002 |

* cited by examiner

*Primary Examiner* — Brian Healy
*Assistant Examiner* — Mary El Shammaa
(74) *Attorney, Agent, or Firm* — K&L Gates LLP

(57) ABSTRACT

The occurrence of the poor electric connection between the outer circuit and the liquid crystal display device can be reduced in the manufacturing method of the outer circuit and liquid display device of this invention. The liquid crystal display device has the pixel region 100P and the outer connection region 107. There are the gate metal layer 15 disposed on the gate insulating film 12, the interlayer insulating film 16 covering the gate metal layer 15, the first conductive layer 19 covering the gate metal layer 15 located on the interlayer insulating film 16, the passivation film 20 with the second opening 22 exposing the part of the first conductive layer 19 that covers the gate metal layer 15, and the second conductive layer 26 covering the first conductive layer 19 exposed from the second opening 22 in the outer connection region. The metal bump 50 of the outer circuit is connected on the second conductive layer 26 through thermal pressure treatment.

15 Claims, 10 Drawing Sheets

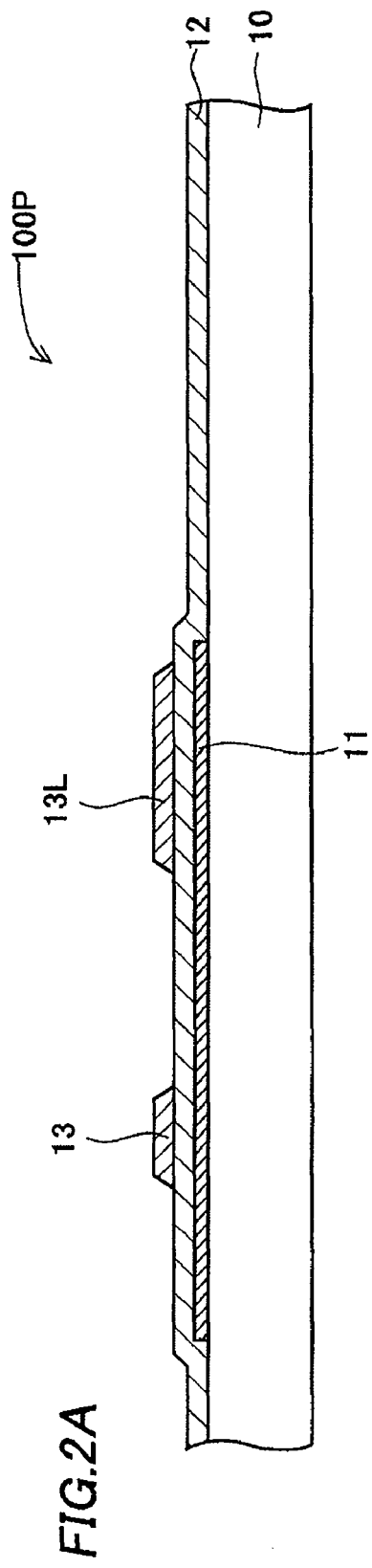
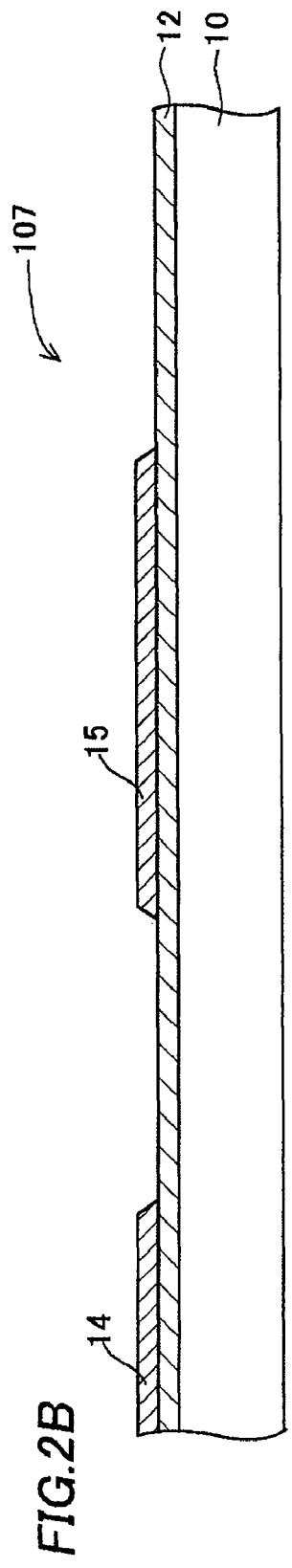

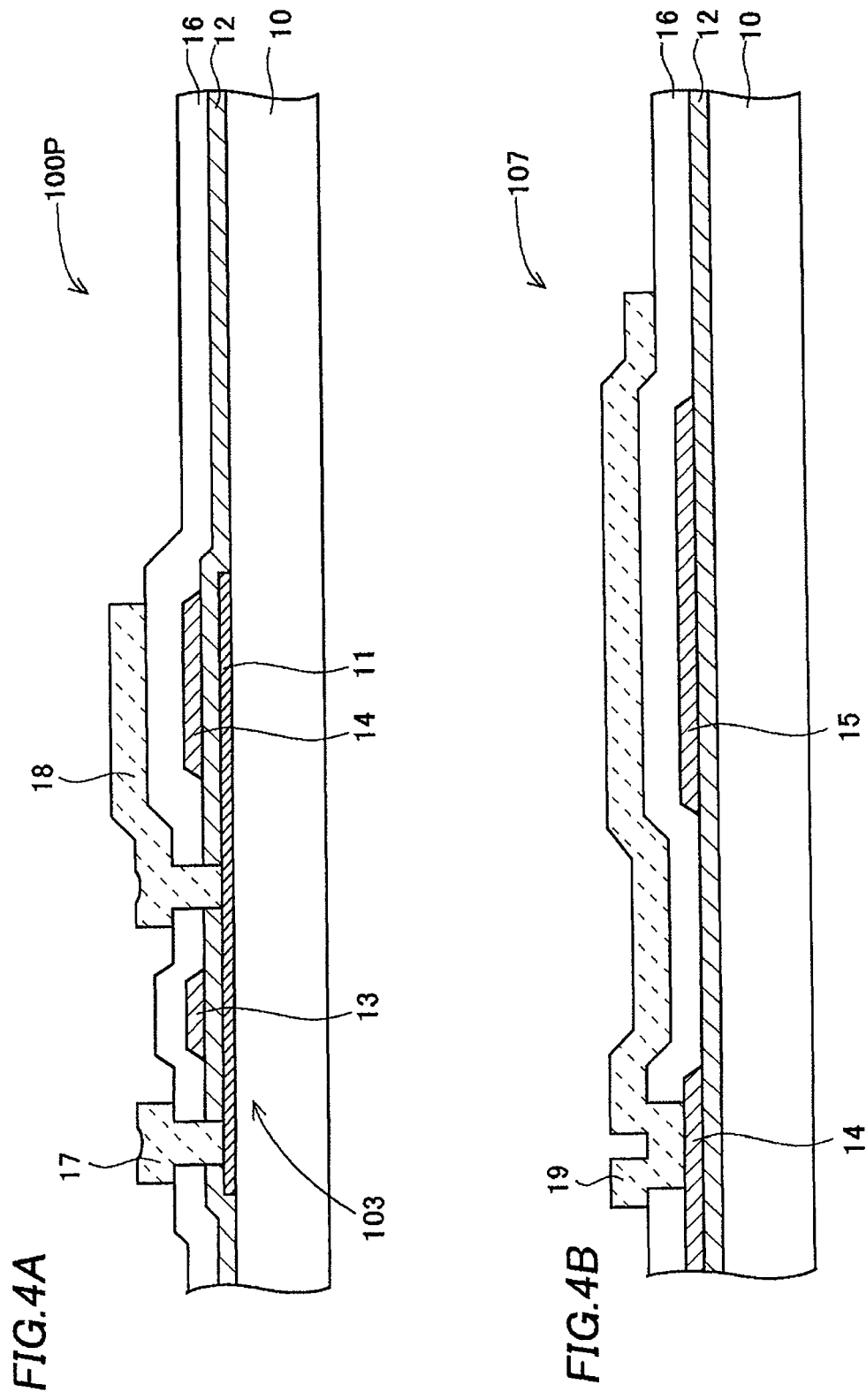

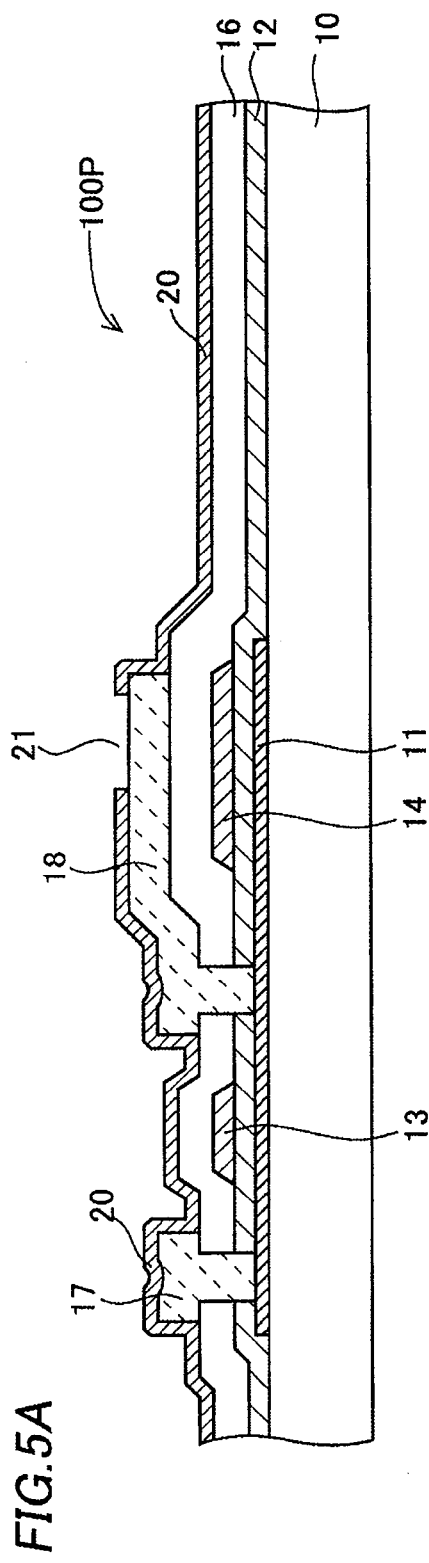
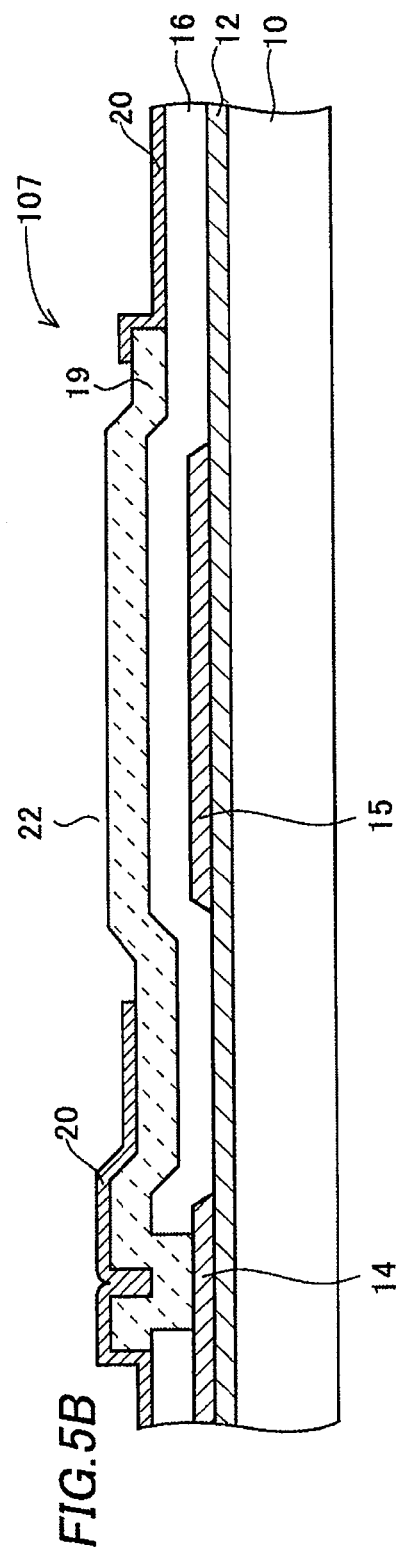
FIG.5A
FIG.5B

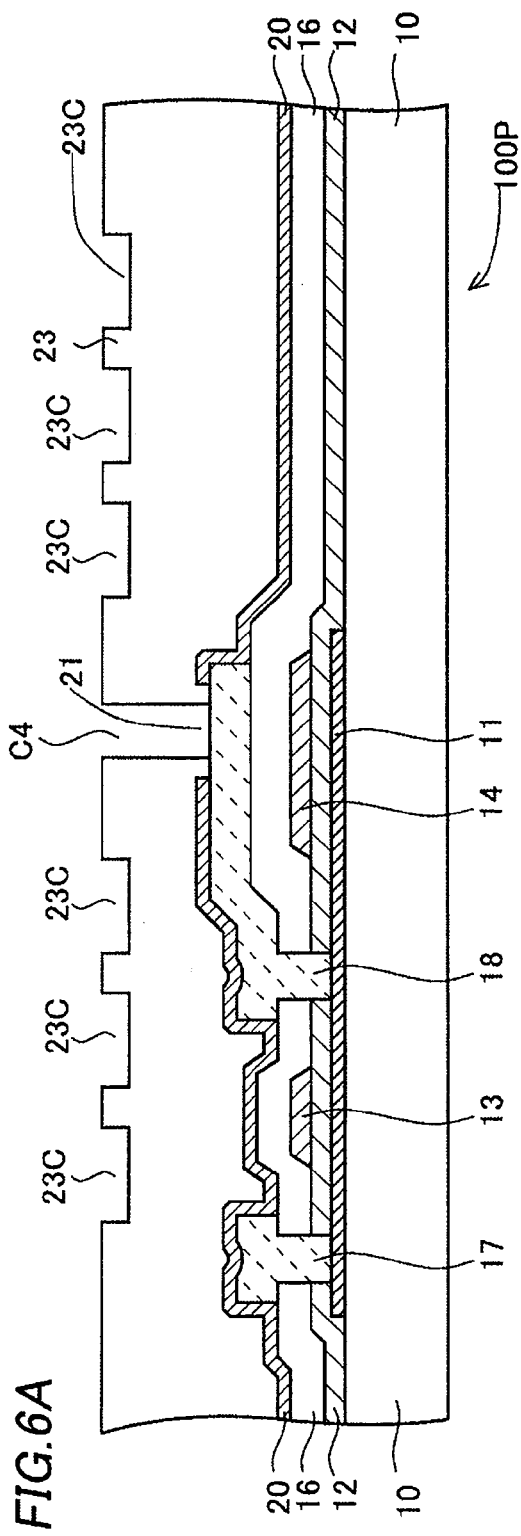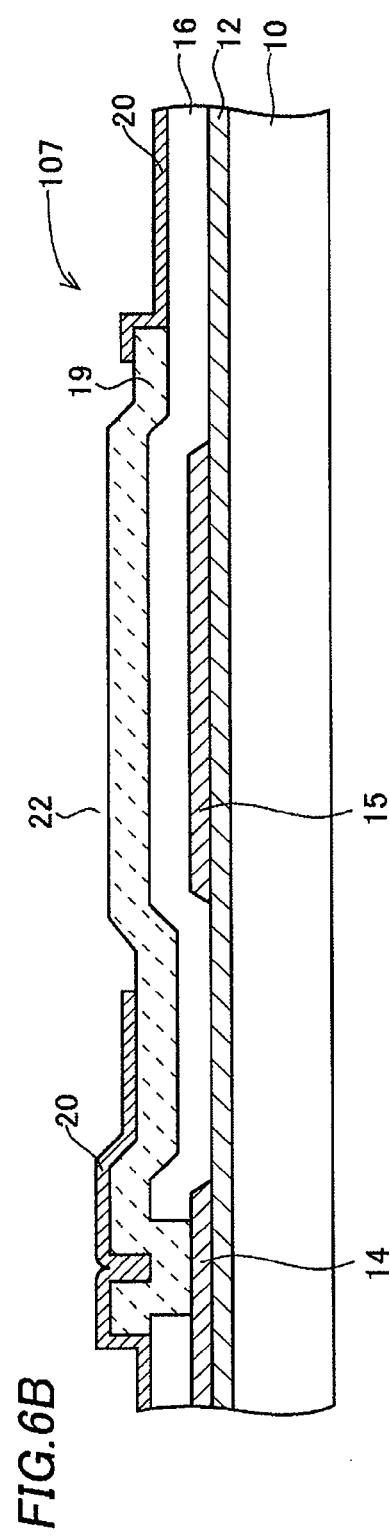

LIQUID CRYSTAL DISPLAY DEVICE AND ITS MANUFACTURING METHOD

This application is a continuation of Ser. No. 11/488,144, filed Jul. 18, 2006, now U.S. Pat. No. 7,446,845.

CROSS-REFERENCE OF THE INVENTION

This invention is based on Japanese Patent Application No. 2005-211407, the content of which is incorporated herein by reference in its entirety.

BACKGROUND OF THE INVENTION

1. Field of the Invention

This invention relates to a liquid crystal display device, especially a liquid crystal display device with an outer connection region that connects a pixel region and an outer circuit and its manufacturing method.

2. Description of the Related Art

Demands for liquid crystal display device have dramatically increased in recent years as portable electronics such as cell phone and digital camera are getting popular. COG, or Chip on Glass, is known as a liquid crystal display devices, where an outer circuit is mounted on a glass substrate, one of the configuring parts of the liquid crystal display device. The liquid crystal display device of prior art with an outer circuit mounted through COG method is explained by referring to FIGS. 10 and 11. FIG. 10 is a plan view showing the configuration of the liquid crystal display device.

A pixel region 100P configured from a plurality of display pixels with pixel selection thin film transistors (TFT) is formed on a liquid crystal display device, a panel 100 made of a glass substrate, as shown in FIG. 10.

In the pixel region 100P, an N channel type pixel election TFT 103, for example, is disposed near the crossing point between a scanning line 101 extending in row direction and a data line 102 extending in column direction. The gate of the pixel selection TFT 103 is connected to the scanning line 101 and the source of the pixel selection TFT 103 is connected to the data line 102. A pixel selection signal G outputted from a vertical driving circuit 201 is applied to the scanning line 101, controlling on and off of the pixel selection TFT 103. A display signal D from a horizontal driving circuit 202 is applied to the data line 102.

A pixel electrode and a common electrode, both of which are not shown in the figure, are formed on an opposite side of the liquid crystal layer LC. The drain of the pixel selection TFT 103 is connected to the pixel electrode. The liquid crystal layer LC is shown as a capacitor as it functions as a dielectric body. A storage capacitance, not shown in the figure, is also connected to the drain of the pixel election TFT 103 for holding the display signal D applied to the pixel electrode for one horizontal period. Although the data line 102 is connected to the source and the pixel electrode is connected to the drain of the pixel selection TFT 103 in the figure, it is possible to connect the pixel electrode to the source and the data line 102 to the drain.

An outer connection region 107 that connects the vertical driving circuit 201 and the horizontal driving circuit 202 to an outer circuit (such as the driving circuit supplying signals including a standard clock and electric source) is formed outside of the pixel region 100P, that is, the peripheral area of the liquid crystal display panel 100. A wiring layer, where wire comes out from the vertical driving circuit 201 and the horizontal driving circuit 202, and a terminal 108 are disposed in the outer connection region 107. A metal bump 150, which is a terminal of the outer circuit, not shown in the figure, is connected to the terminal 108 of the outer connection region 107 through a plurality of same-sized conductive resin balls 140 and an anisotropic conductive film (ACF) 141 made of insulating adhesive agent.

FIG. 11 is a cross-sectional view of the terminal 108 of the outer connection region 107 along with the line X-X in FIG. 10. A gate metal layer 111 that is made of the same material as that of the gate electrode of the pixel election TFT 103 is formed on a substrate 110 in the outer connection region 107, as shown in FIG. 11. A gate insulating film 112 and a flattening film 113 are formed with an opening 120 for exposing a part of the gate metal layer 111 on the substrate 110.

A layer (referred to as an ITO layer 114, hereinafter) made of the same material as that of the gate electrode, such as ITO (indium tin oxide), not shown in the figure, is formed on the part of the gate metal layer 111 exposed from the opening 120. The anisotropic conductive film 141 that includes a plurality of conductive resin balls 140 is formed on the ITO layer including the inside of the opening 120. The metal bump 150, which is the terminal of the outer circuit, is placed on the ITO layer 114, the top layer electrode of the terminal 108 of the outer connection region 107. Then, they are connected through the thermal pressuring.

Next, the operation of the liquid crystal display device will be explained. The pixel selection TFT 103 turns on when a high level pixel selection signal G from the outer circuit, not shown in the figure, and the vertical driving circuit 201 is applied to the scanning line 101 for one horizontal period. Then, the display signal D outputted from the outer circuit not shown in the figure or the horizontal driving circuit 202 to the data line 102 is stored in the storage capacitance, not shown in the figure, through the pixel selection TFT 103 and applied to the pixel electrode mentioned above. Then, the electric field of the liquid crystal layer LC is controlled for one horizontal period according to the display signal D, and the alignment of the liquid crystal molecule is controlled according to the electric field. A black display or a white display of the liquid crystal is achieved. A desirable image can be obtained by performing this operation through the entire display region for one field period.

The technical reference related to this invention is found in Japanese Patent Application Publication No. 2002-229058.

However, the distance between the surface of the metal bump 150 that is the terminal of the outer circuit not shown in the figure and the surface of the ITO layer 114 is greater inside the opening 120 than outside the opening 120 of the outer connection region 107, as shown in the figure. Therefore, a conductive resin ball 140 in the anisotropic conductive film stays untouched either by the metal bump 150 of the outer circuit or the ITO layer 114. That leads to the poor electric connection between the metal bump 150 and the terminal 108 of the outer connection region 107. As a result, the yield rate of the liquid crystal display device with the outer circuit connected is deteriorated.

SUMMARY OF THE INVENTION

The invention provides a display device that includes a substrate having a pixel region and an outer connection region. The outer connection region is configured to provide a connection to a device external to the display device. The device also includes a plurality of display pixels formed in the pixel region, a metal layer disposed in the outer connection region, an insulating film disposed on the substrate and covering the metal layer, and a conductive layer disposed on the insulating film and including a first conductive portion located above the metal layer and a second conductive portion extending beyond a lateral edge of the metal. The first conductive portion is raised from the second conductive portion and configured to be connected to the external device.

The invention also provides a manufacturing method of a display device. The method includes providing a substrate having a pixel region and an outer connection region, forming an activation layer on the pixel region, forming a first insulating film on the outer connection region and pixel region having the activation layer formed thereon, forming simultaneously a gate electrode on the first insulating film at the pixel region and a metal layer on the first insulating film at the outer connection region, forming a second insulating film on the gate electrode and the metal layer, and forming a first conductive layer on the second insulating film only at the outer connection region so that the first conductive layer covers the metal layer and part of the outer connection region surrounding the metal layer.

BRIEF DESCRIPTION OF THE DRAWINGS

FIG. 2 is a cross-sectional view showing the manufacturing method of the liquid crystal display device of this invention.

FIG. 4 is a cross-sectional view showing the manufacturing method of the liquid crystal display device of this invention.

FIG. 5 is a cross-sectional view showing the manufacturing method of the liquid crystal display device of this invention.

FIG. 6 is a cross-sectional view showing the manufacturing method of the liquid crystal display device of this invention.

DETAILED DESCRIPTION OF THE INVENTION

Figure 1A:
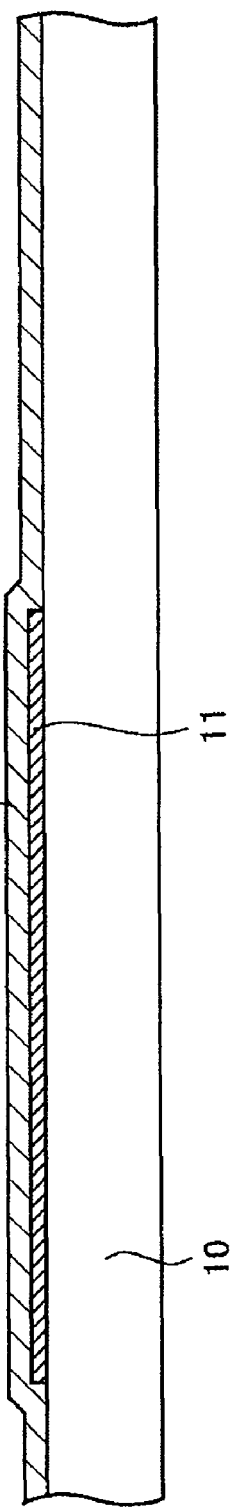
FIG. 1 is a cross-sectional view showing the manufacturing method of the liquid crystal display device of this invention.

Next, an embodiment of the liquid crystal display device of this invention and its manufacturing method will be explained by referring to FIGS. 1A-9. FIGS. 1A-9 show the manufacturing method of the liquid crystal display device of the embodiment. The configurations in the drawings that are the same configurations as in FIGS. 10 and 11 have the same reference numerals. FIG. 1A shows the cross section of the neighboring area of the pixel selection TFT 103 of one display pixel among a plurality of the display pixels in the pixel region 100P of FIG. 10.

Figure 1B:
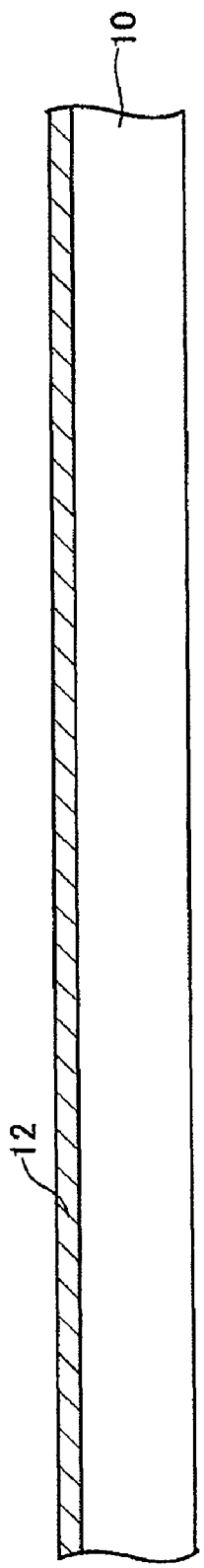
Figure 8:
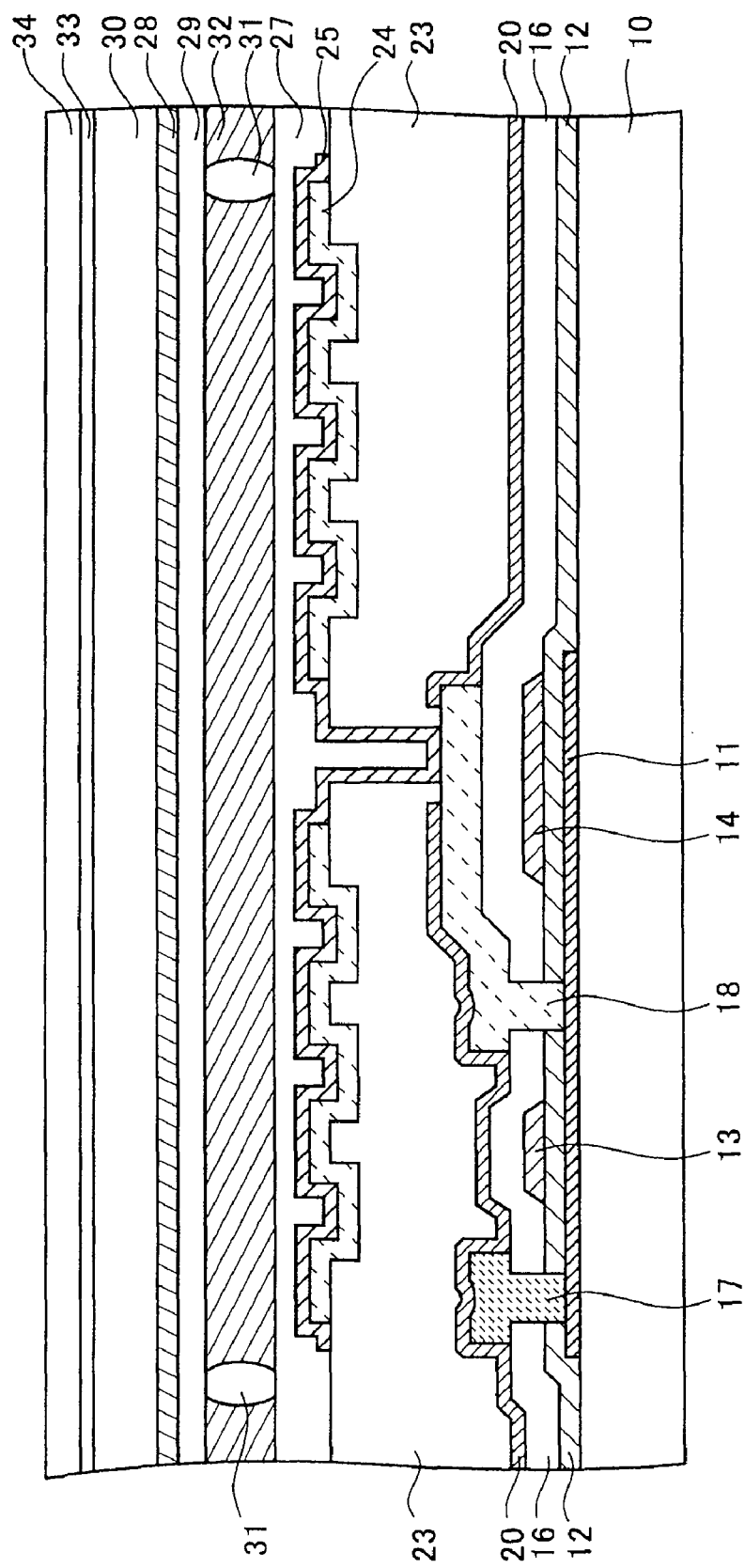
FIG. 8 is a cross-sectional view showing the liquid crystal display device of this invention and its manufacturing method.
Figure 9:
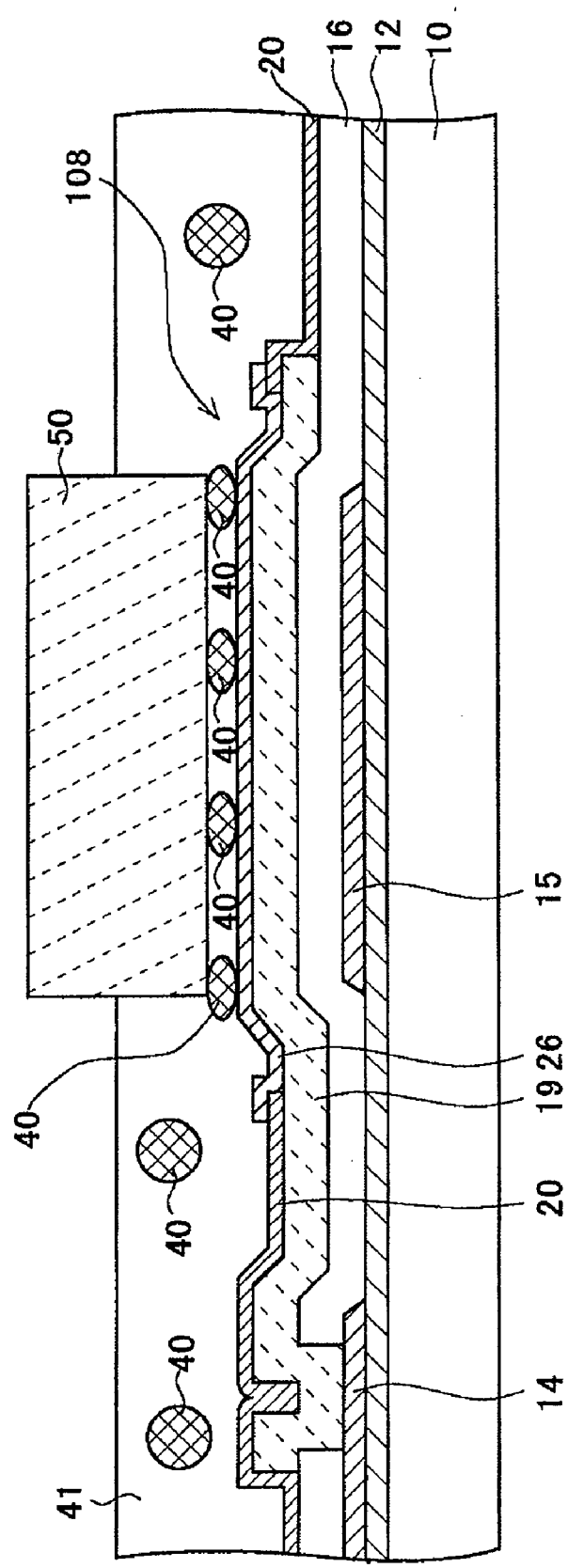
FIG. 9 is a cross-sectional view showing the liquid crystal display device of this invention and its manufacturing method.
Figure 10:
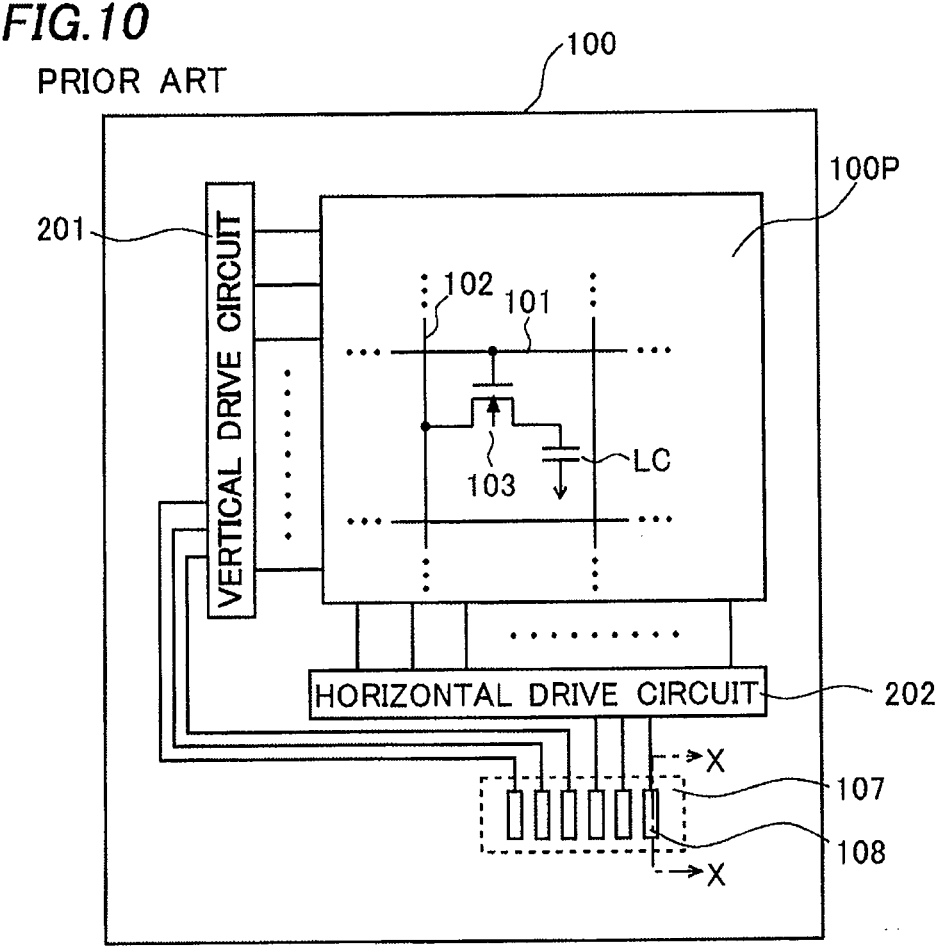
FIG. 10 is a plan view of the liquid crystal display device of prior arts.
Figure 11:
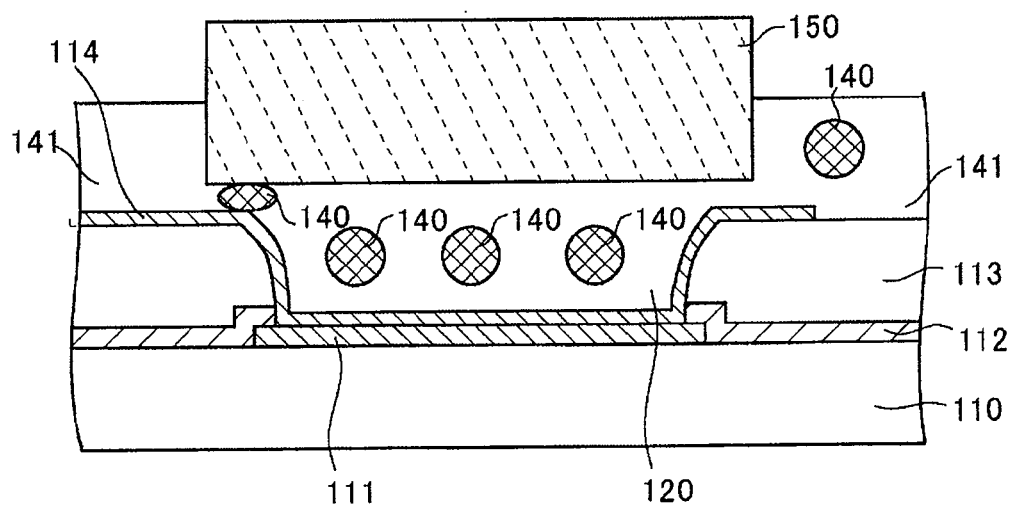
FIG. 11 is a cross-sectional view of the liquid crystal display device of prior arts.

FIG. 1B shows the cross section of the terminal 108 of the outer connection region 107 along the line X-X in FIG. 10. FIGS. 2A-7B also show the cross section of the same two areas shown in FIGS. 1A and 1B. FIG. 8 shows the cross section of the neighboring area of the pixel selection TFT 103 of one display pixel among a plurality of the display pixels in the pixel region 100P of FIG. 10. FIG. 9 shows the cross section of the terminal 108 of the outer connection region 107 shown in FIG. 10.

First, a first substrate 10 made of, for example, glass is prepared, as shown in FIGS. 1A and 1B. The regions corresponding to the pixel region 100P and the outer connection region 107 shown in FIG. 10 are designated on the first substrate 10.

Next, a poly-silicon layer 11 is formed as an activation layer of the pixel selection TFT 103 shown in FIG. 10 on the pixel region 100P of the first substrate, as shown in FIG. 1A. Then, a gate insulating film 12 that is made of, for example, silicon oxidation film or silicon nitride film is disposed as a first insulating film on the first substrate 10 to cover the poly-silicon layer 11. Only the gate insulating film 12 is formed on the first substrate in the outer connection region 107 shown in FIG. 1B.

Then, a metal layer that will become a gate electrode, such as a chrome (Cr) layer with the thickness of 0.25 μm is disposed on the entire surface of the gate insulating film 12. A predetermined pattern is created on the chrome layer through etching using a mask not shown in the figure, as shown in FIGS. 2A and 2B. The gate electrode 13 and a wiring layer 13L, which are made of the same material, are formed in the pixel region 100P shown in FIG. 2A. Also, a wiring layer 14, which is made of the same material as that of the metal layer 13, is formed on the gate insulating film 12 in the outer connection region 107 of the FIG. 2B. The wiring layer 14 is connected to a vertical driving circuit 201 and a horizontal driving circuit 202 not shown in the figure and extends to a predetermined area. A gate metal layer 15 that has a size corresponding to the terminal 108 of the outer connection region 107 and that is made of the same material as that of the gate electrode 13 is disposed at the area corresponding to the terminal 108 on the gate insulating film 12.

Figure 3A:
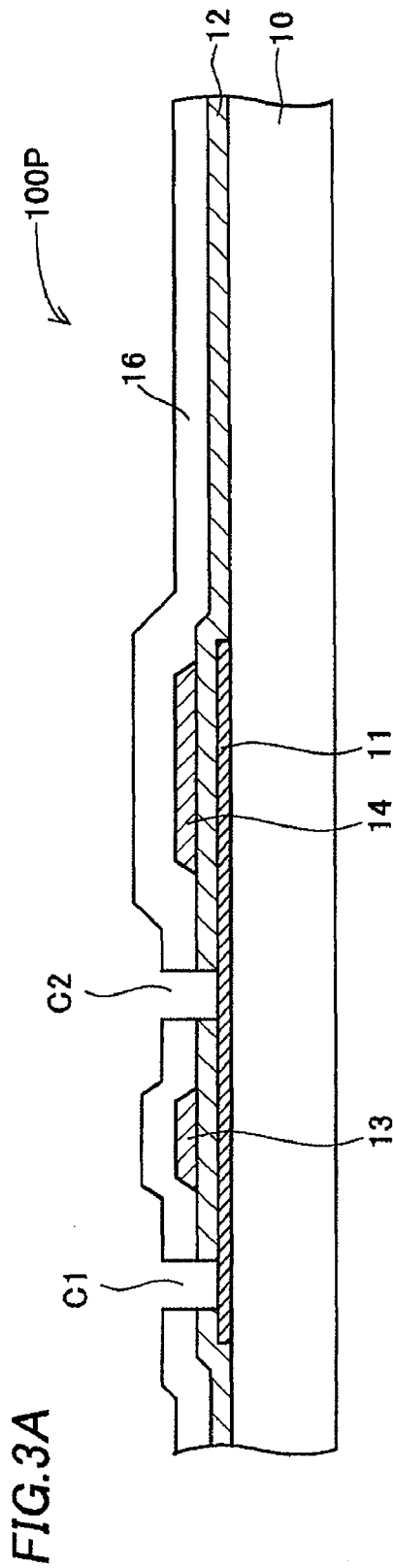
FIG. 3 is a cross-sectional view showing the manufacturing method of the liquid crystal display device of this invention.
Figure 3B:
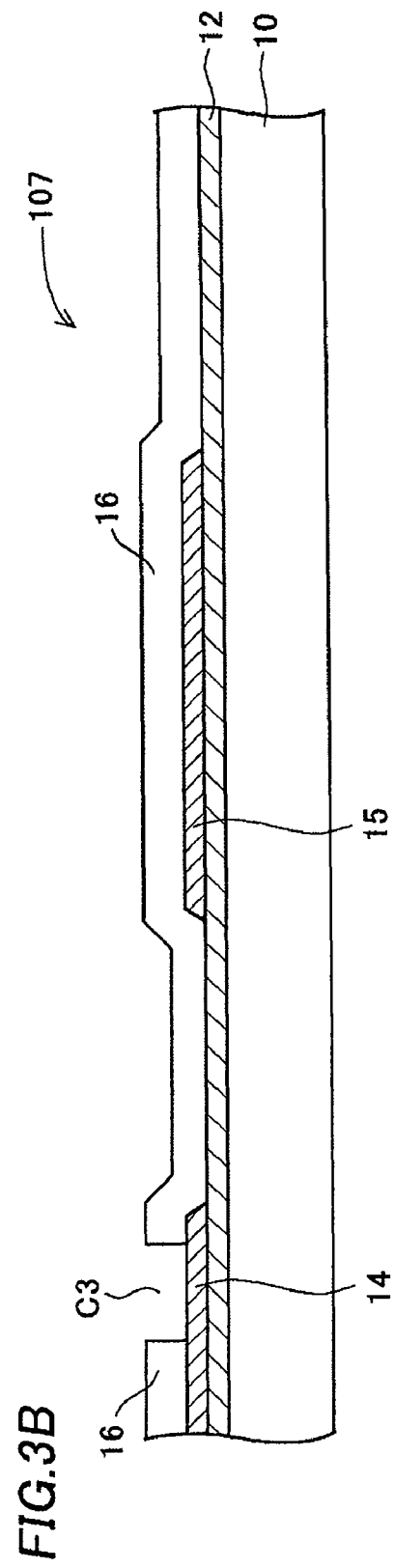

Next, an interlayer insulating film 16, as a second insulating film made of, for example, silicon oxidation film or silicon nitride film with the thickness of 0.5 μm is formed on the gate insulating film 12 to cover the gate electrode 13, the wiring layers 13L, 14 and the gate metal layer 15 as shown in FIGS. 3A and 3B. First and second contact holes C1, C2 that expose the source region and the drain region of the poly-silicon layer 11 and that go through a part of the gate insulating film 12 and the interlayer insulating film 16 are formed in the pixel region 100P as shown in FIG. 3A. A third contact hole C3 is also formed to expose a part of the wiring layer 14 in the outer connection region 107 as shown in FIG. 3B.

A metal layer that can function as a source electrode and a drain electrode of the pixel selection TFT made of, for example, an aluminum (Al) layer with the thickness of 0.4 μm is formed on the entire surface of the interlayer insulating film 16 including the contact holes C1, C2, and C3, as shown in FIGS. 4A and 4B.

Then, a predetermined pattern is created on the aluminum layer through etching using a mask not shown in the figure. A source electrode 17 and a drain electrode 18, which are made of the same material, are formed in the pixel region 100P as shown in FIG. 4A. Also, a first conductive layer 19, which is made of the same material as that of the source electrode 17 and the drain electrode 18, is formed on the interlayer insulating film 16 on the area to cover the gate metal layer 15 in the outer connection region 107 of the FIG. 4B. The first conductive layer 19 extends to the wiring layer 14 and is connected to the wiring layer 14 through the contact hole C3.

A passivation film 20 made of, for example, silicon oxidation film or silicon nitride film with the thickness of 0.3 μm is formed on the interlayer insulating film 16 to cover the source region 17 and the drain region 18 as shown in FIGS. 5A and 5B.

Then, a predetermined pattern is created on the passivation film 20 through etching using a mask not shown in the figure. A first opening 21 that exposes a part of the drain electrode is formed in the pixel region 100P as shown in FIG. 5A. A second opening 22 is also formed to expose a part of the first conductive layer 19 that covers the gate metal layer 15 in the outer connection region 107 as shown in FIG. 5B. The diameter of the second opening 22 should be larger than the plane size of the gate metal layer 20.

A flattening film 23 made of, for example, an applied oxidation film is formed on the entire surface of the passivation film 20 including the interior of the first and second openings 21 and 22, as shown in FIGS. 6A and B.

A plurality of concaves 23C with a predetermined depth are formed in the area designated for the formation of the pixel electrode, which will be mentioned later, through etching of the flattening film 23 in the pixel region 100P of FIG. 6A using a mask not shown in the figure. The formation of the concaves 23C can be omitted. A contact hole C4, which exposes the location for the drain electrode 18, corresponding to the location of the first opening 21 is formed in the pixel region 100P of FIG. 6A using a different mask from the previous one. The flattening film 23 is removed at the outer connection region 107 as shown in FIG. 6B.

Figure 7A:
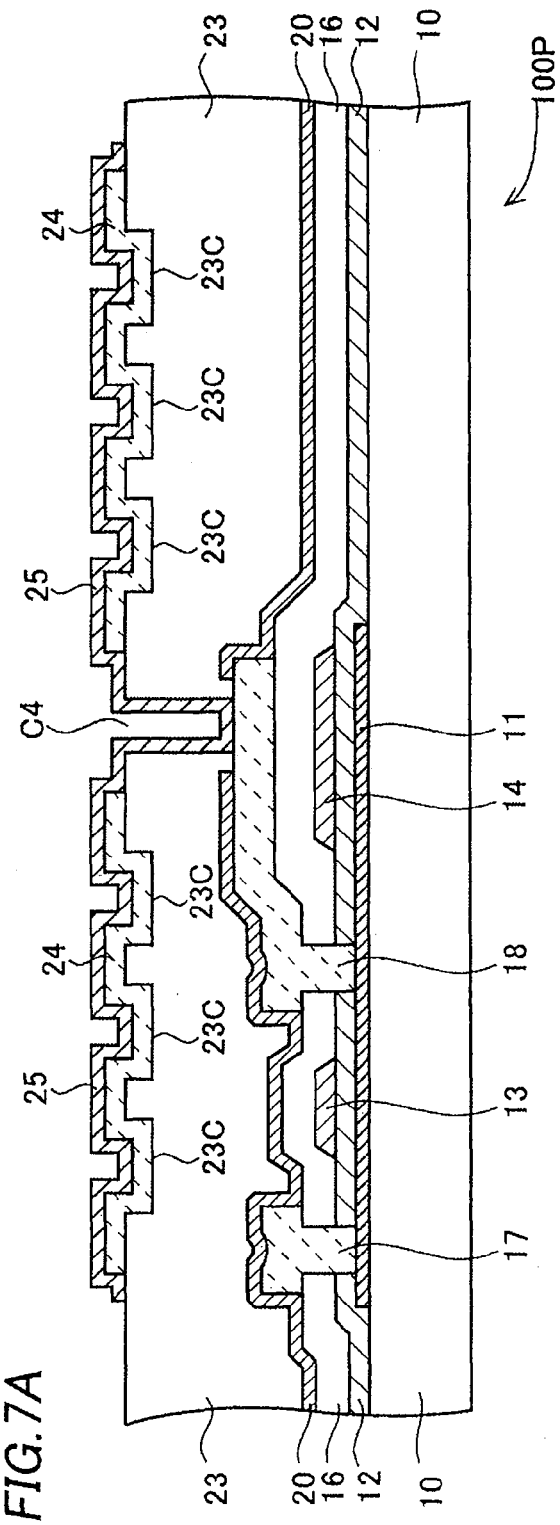
FIG. 7 is a cross-sectional view showing the manufacturing method of the liquid crystal display device of this invention.
Figure 7B:
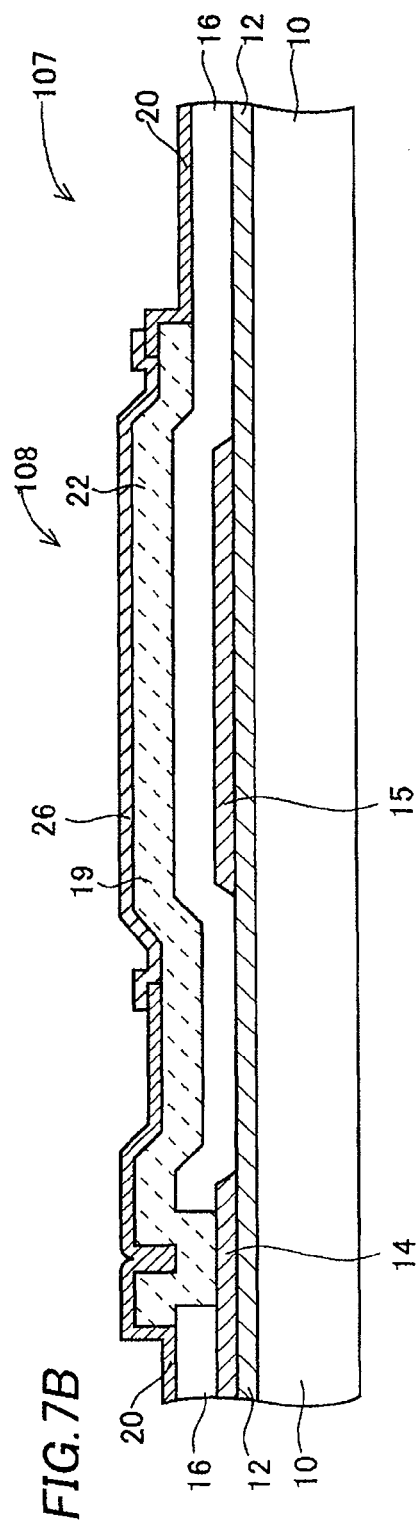

A reflecting metal layer 24 made of, for example, aluminum (Al) is formed on a part of the flattening film 23 that includes the area of the concaves 23C in the pixel region, as shown in FIG. 7A. A metal layer that can be a pixel electrode of the liquid crystal display device made of, for example, an ITO layer with the thickness of 0.1 μm is formed to cover the interior of the fourth contact hole C4, the passivation film 20, the flattening film 23, the reflecting metal layer 24, and the first conductive layer 19 exposed from the second opening 22 in both the pixel region 100P and the outer connection region 107, as shown in FIGS. 7A and 7B.

Then, a predetermined pattern is created on the ITO film through etching using a mask not shown in the figure. A pixel electrode 25 that is connected to the drain electrode 18 through the contact hole C4 and that extends over the flattening layer 23 covering the reflecting metal layer 24 is formed in the pixel region 100P, as shown in FIG. 7A. A second conductive layer 26 that covers the first conductive layer 19 exposed through the second opening 22 and that is made of the same material as that of the pixel electrode 25 is also formed in the outer connection region 107, as shown in FIG. 7B. This second conductive layer 26 is the upper most electrode layer of the terminal 108 of the outer connection region 107.

The height of the second conductive layer 26 is larger than or the same as that of the passivation film 20 which exists in the neighboring area. However, it is also acceptable that the height of the second conductive layer 26 is smaller than that of the passivation film 20 which exists in the neighboring area, if the same operation efficiency is acquired. In such cases, the difference in height between the second conductive layer 26 and the part of the second conductive layer mounted on the passivation film 20 should be determined to obtain a "deformation amount" that leads to an excellent conductivity of conductive resin balls, which will be explained later.

The thickness of the gate metal layer 15, the interlayer insulating film 16, the first conductive layer 19 and the second conductive layer 26 can be arbitrary as long as the condition on height difference mentioned in the previous section is fulfilled.

Then, a first alignment film 27 is formed in the pixel region 100P, as shown in FIG. 8. A second substrate 30 made of, for example, glass with a common electrode 28 made of ITO layer and a second alignment film 29 is put together with the first substrate 10 with a spacer 31 between them. Then, liquid crystal is inserted between the first alignment film 27 and the second alignment film 29, forming a liquid crystal layer 32. A retardation plate 33 and a polarizing plate 34 are disposed on the outer side of the second substrate 30, completing the liquid crystal display device in the pixel region 100P.

An outer circuit that is a driving circuit for supplying, for example, the standard clock and the electric source is connected to the outer connection region 107, as shown in FIG. 9. Only the metal bump 50 that is the terminal of the outer connection region is shown in FIG. 9. A plurality of the same-sized conductive resin balls 40 and the anisotropic conductive film 41 made of insulating adhesive agent are attached to cover the second conductive layer 26 when the metal bump 50 is connected to the outer connection region 107. Next, the metal bump 50 is disposed on the upper most electrode layer of the outer connection region 107, which is the second conductive layer 26, with the anisotropic conductive film 41 between them. Then, the metal bump 50 is pressed against the terminal 108 of the outer connection region 107 through a predetermined thermal treatment.

The conductive resin balls 40 locating on the second conductive layer 26 among a plurality of the conductive resin balls 40 in the anisotropic conductive film 41 are deformed between the second conducive layer 26 and the metal bump 50 acquiring a certain amount of surface area of the conductive resin ball contacting with both the second conductive layer 26 and the metal bump 50. That is, the metal bump 50 and the terminal 108 of the outer connection region 107 are electrically connected through the conductive resin ball 40. The metal gate layer 15 raises the level of the terminal 108 and assures the contact between the metal bump 50 and the conductive layer 19, 26.

The poor electric connection observed in prior arts can be avoided when the metal bump 50 and second conductive layer 26 are connected through the anisotropic conductive film 41, leading to the improved yield rate of the liquid crystal display device with the outer circuit.

Although the second conductive layer 26 is the upper most electrode layer of the terminal 108 of the outer connection region 107 in this embodiment, this invention is not limited to this configuration. That is, the first conductive layer 19 can be the upper most electrode layer of the terminal 108 of the outer connection region 107, omitting the formation of the second conductive layer 26.

However, the conductive resin ball 40 should be deformed between the metal bump 50 and the first conductive layer 19 to acquire a certain amount of surface area of the conductive resin ball contacting with both the first conductive layer 19 and the metal bump 50, when the metal bump 50 and the first conductive layer 19 are connected. Therefore, the height of the first conductive layer 19 should be the same as, or greater than the height of the passivation film 20. For example, it is possible to form the gate metal layer 15 with a considerable thickness to fulfill the condition explained above.

It is also acceptable that the height of the second conductive layer 26 is smaller than that of the passivation film 20 which exists in the neighboring area, if the same operation efficiency is acquired. In such cases, the difference in height between the second conductive layer 26 and the part of the second conductive layer mounted on the passivation film 20 should be determined to obtain a "deformation amount" that leads to an excellent conductivity of conductive resin balls. In such cases, the part of the second conductive layer 26 which is mounted on the passivation film 20 functions as a wall to prevent the conductive resin ball 40 from slipping away from the top of the second conductive layer 26.

Although the metal gate layer 15 of the outer connection region 107 is made of the same material as that of the gate electrode 13 in this embodiment, this invention is not limited to this configuration. The gate metal layer can also be formed by using a different material from that of the gate electrode and at the separate manufacturing process from that of the gate electrode.

What is claimed is:

1. A display device comprising:
    a substrate comprising a pixel region and an outer connection region, the outer connection region being configured to provide a connection to a device external to the display device;
    a plurality of display pixels formed in the pixel region;
    a metal layer disposed on the outer connection region;
    an insulating film disposed on the substrate so as to be over the outer connection region to cover the metal layer; and
    a conductive layer disposed on the insulating film and comprising a first conductive portion located above the metal layer and a second conductive portion extending beyond a lateral edge of the metal layer,
    wherein the first conductive portion is raised from the second conductive portion and configured to be connected to the external device, and
    the insulating film is disposed between the metal layer and the conductive layer.

2. The display device of claim 1, further comprising another conductive layer disposed on the conductive layer.

3. The display device of claim 1, further comprising a metal bump disposed on the conductive layer.

4. The display device of claim 2, further comprising a metal bump disposed on the another conductive layer.

5. The display device of claim 1, wherein each of the display pixels comprises a pixel selection transistor comprising an activation layer disposed between the substrate and a gate insulating film, a gate electrode is disposed on the gate insulating film, the insulating film is disposed on the gate electrode, and the gate electrode and the metal layer are made of the same material.

6. The display device of claim 2, wherein each of the display pixels comprises a pixel selection transistor comprising an activation layer disposed between the substrate and a gate insulating film, a gate electrode is disposed on the gate insulating film, the insulating film is disposed on the gate electrode, and the gate electrode and the metal layer are made of the same material.

7. The display device of claim 1, further comprising a passivation layer disposed on the conductive layer and having an opening for the connection to the external device, wherein the conductive layer is connected to the external device through the opening, and a top surface of the first conductive portion is at a level higher than or equal to a top surface of the passivation film.

8. The display device of claim 2, further comprising a passivation layer disposed on the conductive layer and having an opening for the connection to the external device, wherein the another conductive layer is connected to the external device through the opening, and a top surface of the another conductive layer located above the first conductive portion is at a level higher than or equal to a top surface of the passivation film.

9. The display device of claim 5, wherein the transistor comprises a source electrode and a drain electrode that are connected to the activation layer, and the source electrode, the drain electrode and the conducive layer are made of the same material.

10. The display device of claim 1, further comprising a wiring layer disposed in the outer connection region, wherein the insulating film and the conductive layer are disposed on the wiring layer, and the wiring layer is connected to the conductive layer through an opening formed in the insulating film.

11. The display device of claim 2, further comprising a wiring layer disposed in the outer connection region, wherein the insulating film and the conductive layer are disposed on the wiring layer, and the wiring layer is connected to the conductive layer through an opening formed in the insulating film.

12. The display device of claim 2, wherein each of the display pixels comprises a pixel electrode, and the another conductive layer and the pixel electrode are made of the same material.

13. A manufacturing method of a display device, comprising:
    providing a substrate comprising a pixel region and an outer connection region;
    forming an activation layer on the pixel region;
    forming a first insulating film on the outer connection region and pixel region having the activation layer formed thereon;
    forming simultaneously a gate electrode on the first insulating film at the pixel region and a metal layer on the first insulating film at the outer connection region, the metal layer being disposed on the outer connection region;
    forming a second insulating film on the gate electrode in the pixel region and on the metal layer in the outer connection region; and
    forming a conductive layer on the second insulating film only at the outer connection region so that the conductive layer covers the metal layer and part of the outer connection region surrounding the metal layer,
    wherein the insulating film is formed between the metal layer and the conductive layer.

14. The display device of claim 1, wherein the first conductive portion raised from the second conductive portion is disposed on the outer connection region.

15. A display device, comprising:
    a substrate comprising a pixel region and an outer connection region, the outer connection region being configured to provide a connection to a device external to the display device;
    a plurality of display pixels formed in the pixel region;
    a metal layer disposed on the outer connection region;
    an insulating film disposed on the substrate so as to be over the outer connection region to cover the metal layer; and
    a conductive layer disposed on the insulating film and comprising a first conductive portion located above the metal layer and a second conductive portion extending beyond a lateral edge of the metal layer,
    wherein the first conductive portion is raised from the second conductive portion and configured to be connected to the external device, and
    the metal layer is not electrically connected to the conductive layer.

* * * * *